United States Patent [19]

Saito et al.

[11] Patent Number: 4,653,684
[45] Date of Patent: Mar. 31, 1987

[54] WELDING MATERIAL FOR AUSTENITE STAINLESS STEEL HAVING HIGH SI CONTENT AND METHOD OF APPLICATION

[75] Inventors: Kiichi Saito; Masahiro Aoki; Noriyasu Ikeda, all of Jyouetsu; Masayoshi Miki; Masaaki Nagayama, both of Niihama, all of Japan

[73] Assignees: Nippon Stainless Steel Co. Ltd.; Sumitomo Chemical Co., Ltd., both of Osaka, Japan

[21] Appl. No.: 650,763

[22] Filed: Sep. 12, 1984

[51] Int. Cl.$^4$ .................. C22C 38/34; C22C 38/40; B23K 35/22
[52] U.S. Cl. ............... 228/263.15; 420/50; 420/51; 420/584
[58] Field of Search ............... 75/128 C, 128 G; 420/584; 148/38; 228/263.11, 263.15; 219/146.23, 85 H

[56] References Cited

U.S. PATENT DOCUMENTS 4,171,218 10/1979 Hoshino et al. .................. 75/128 G
4,279,648 7/1981 Ilto et al. ........................ 75/128 C

FOREIGN PATENT DOCUMENTS 53-163014 12/1978 Japan .................. 75/128 A
59-59863 4/1984 Japan .................. 75/128 C Primary Examiner—L. Dewayne Rutledge
Assistant Examiner—Deborah Yee
Attorney, Agent, or Firm—David G. Rosenbaum

[57] ABSTRACT

This invention relates to a welding material for welding a high-Si austenite stainless steel, capable of ensuring a high corrosion resistance of the weld metal in hot nitric acid of high concentration, while maintaining a toughness of the weld metal not smaller than 2 Kg-m/cm$^2$, and the method of application therefor. The welding material has a composition containing not greater than 0.015% of C, 5 to 7% of Si, not greater than 2% of Mn, 15 to 20% of Cr, 10 to 22% of Ni, not greater than 0.02% of N, not greater than 0.45% of one or both of Nb and Ta, and the balance substantially Fe and inevitable impurities the sum of C and N contents is selected to be not greater than 0.03% and the sum of Nb and Ta contents is selected to be not smaller than 15×(C+N)%. The Ni-balance value given by the following formula ranges between −4 and −2.

Ni balance value = %
Ni+30(%C+%N)+0.5(%Mn)−1.1(%Cr+1.5-×%Si)+8.2

2 Claims, 3 Drawing Figures

WELDING MATERIAL FOR AUSTENITE STAINLESS STEEL HAVING HIGH SI CONTENT AND METHOD OF APPLICATION

BACKGROUND OF THE INVENTION

1. Field of the Invention

The present invention relates to a welding material for austenite stainless steel having a high Si content and the method of application therefor and, more particularly, to a welding material which is able to provide the weld metal with excellent toughness and corrosion resistance to nitric acid and the method of application therefor.

2. Description of the Prior Art

Environments containing nitric acid, particularly when the temperature and concentration are high, exhibit an oxidability which is so strong that stainless steels exhibit an over-passivity. In fact, ordinary stainless steels cannot maintain the passive film in such an environment and experience heavy intergranular corrosion.

On the other hand, silicious materials exhibit an high durability in such a strong oxidizing environment. Therefore, the use of cast iron having a high Si content and glass lining materials is convenient. These materials, however, are impossible to weld and are not suitable for the production of large-sized structures. In addition, these materials are generally fragile and lacking in impact resistance.

Recently, an austenite stainless steel of 16Cr—14Ni—4Si system containing about 4% Si and forming a surface oxide layer mainly constituted by $SiO_2$ is finding a wide use as a metallic material which exhibits a large resistance to oxidation under the above mentioned strong oxidizing environment. Unfortunately, however, even this austenite stainless steel cannot provide satisfactory corrosion resistance in a hot nitric acid environment having a high concentration exceeding 98%.

Under these circumstances, the present inventors have developed and proposed in Japanese Patent Publication No. 9626/1982 (Japanese Patent Laid-Open No. 91960/1980) a high Si austenite stainless steel having a composition containing not greater than 0.03% of C, 5 to 7% of Si, not greater than 10% of Mn, 7 to 16% of Cr, 10 to less than 19% of Ni and, as required, 4×[C] to 2% of at least one of Ti, Ta, Zr and Nb, and the balance Fe and inevitable impurities. This stainless steel exhibits excellent workability and weldability, as well as a high resistance to oxidation in the presence of nitric acid of high concentration and, hence, can be used satisfactorily even in such a strongly corroding environment.

When such an austenite stainless steel having high Si content is subjected to welding, a large quantity of intermetallic compounds of Ni—Si—(Nb, Zr) system are generated in the weld metal. The weld metal containing such intermetallic compounds exhibits an impractically low impact strength at ordinary temperature on the order of 0.5 Kg-m/cm² under the as welded condition, so that the austenite stainless steel mentioned above cannot be used suitably as the structural material. Therefore, a welding material of 16Cr—14Ni—4Si system is used in the case where the weld part is required to have a high impact toughness. Such a welding material, however, undesirably reduces the corrosion resistance of the weld part due to the insufficient Si content. In general, MIG or TIG welding method is adopted in the welding of the metallic materials of the type described above, so that the composition of the welding material can be regarded as being materially identical to the composition of the weld metal.

SUMMARY OF THE INVENTION

Accordingly, an object of the invention is to provide a welding material which can provide a higher toughness of the weld portion of high-Si austenite stainless steel containing 5 to 7% of Si.

More particularly, the invention aims at providing a welding material which can maintain a high toughness of 2 Kg-m/cm² or higher at the weld portion of high-Si austenite stainless steel and ensure a high resistance to corrosion in hot nitric acid solution of high concentration.

These and other objects, features and advantages of the invention will be apparent from the following detailed description of the preferred embodiment thereof taken with the accompanying drawings.

BRIEF DESCRIPTION OF THE DRAWINGS

The accompanying drawings are charts showing the properties of weld metals formed by a welding material of the invention and those formed with comparison examples of the welding material in which.

DESCRIPTION OF THE PREFERRED EMBODIMENTS

Figure 1:
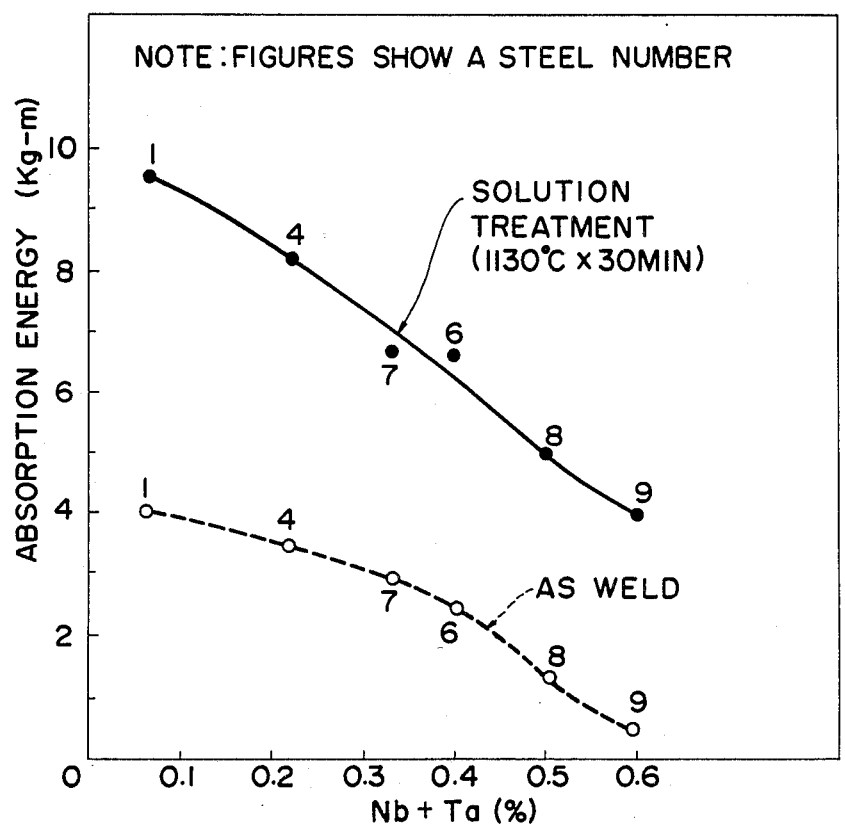
FIG. 1 shows the relation between the impact absorption energy of the weld metal and the (Nb+Ta) content.

As mentioned before, the primary object of the invention is to achieve a high corrosion resistance of the weld portion of high-Si austenite stainless steel containing 5 to 7% of Si in a hot nitric acid environment of high concentration, while maintaining a toughness of not less than 2 Kg-m/cm. To these ends, the present invention proposes a welding material which contains 5 to 7% of Si and has extremely small C and N contents expressed by $C+N \leq 0.03$, while the amounts of stabilizing agents Nb and Ta are so selected as to meet the condition of $(Nb+Ta) \geq 15 \times (C+N)\%$. The contents of primary elements are controlled to meet the following condition:

$$-4 \leq \text{nickel balance} \leq -2$$

The welding material having such a composition can ensure a sufficiently high corrosion resistance of the weld metal in hot nitric acid of a high concentration, as well as a sufficiently low solidification cracking sensitivity, while attaining a remarkable improvement in the toughness of the weld metal to a satisfactory practical level.

More specifically, the invention provides a welding material for welding a high-Si austenite stainless steel, the welding material having a composition containing not greater than 0.015% of C, 5 to 7% of Si, not greater than 2% of Mn, 15 to 20% of Cr, 10 to 22% of Ni, not greater than 0.02% of N, not greater than 0.45% of one or both of Nb and Ta, and the balance substantially Fe and inevitable impurities, wherein the sum of C and N contents is selected to be not greater than 0.03% and the sum of Nb and Ta contents is selected to be not smaller than 15×(C+N)%, and wherein the Ni-balance value given by the following formula ranges between −4 and −2.

Ni balance value=%-Ni+30(%C+%N)+0.5(%Mn)−1.1(%Cr+1.5-×%Si)+8.2

Next, the reasons for the limitation of the contents of the elements in the welding material of the invention will be described hereinunder.

C: The C content is preferably small in order to prevent precipitation of chromium carbides, from the view point of corrosion resistance, particularly in a hot nitric acid environment, which involves an extremely large tendency to cause intergranular corrosion. In the welding material of the invention, however, up to 0.015% of C is permissible due to the stabilizing effect produced by Nb and/or Ta. When the C content is increased beyond 0.015%, the amounts of Nb and Ta necessary for the stabilization of C are increased to such a level as to produce a large amount of intermetallic compound of Ni—Si—Nb system which seriously impairs the toughness of the weld metal. For this reason, the C content should be selected to be not greater than 0.015%.

Si: Si is an essential element because it forms a film of SiO₂ system which provides a high resistance to corrosion in the nitric acid of high concentration. The welding material of the invention should have an Si content substantially equal to that of the base metal to be welded, i.e., an Si content of 5 to 7%. Si content exceeding 7% is not preferred because such a large Si content promotes the production of intermetallic compounds in the weld metal. From this point of view, the Si content should range between 5 to 7%.

Mn: Mn is also essential as an austenite former. Namely, this element contributes to austenitizing of the structure through balancing other major elements such as Cr, Si and Nb. In addition, Mn effectively reduces the welding cracking sensitivity by fixing S which is unavoidably contained as an impurity in the steel composition. Furthermore, addition of Mn as a deoxidizer is quite effective. In the production of the welding material of the invention on an industrial scale, the Mn content is usually 2% or smaller.

Cr: Addition of Cr by an amount not smaller than 15% is essential in order to obtain sufficient general corrosion resistance and corrosion resistance to nitric acid of low and medium concentrations. A Cr content exceeding 20%, however, undesirably allows the generation of a large amount of ferrite in the austenite matrix to form a two-phase structure which seriously impairs the workability and accelerates the sigma brittleness. From this point of view, the Cr content should be selected to range between 15 and 20%.

Ni: Ni is a major austenite former which maintain austenite structure by balancing other major elements such as Cr, Si and Nb. To this end, the Ni content should range between 10 to 22%.

N: As in the case of C, the N content is preferably made small in order to suppress the intergranular corrosion and to minimize the required amount of Nb+Ta. In the practical process of refining of steel, however, inclusion of N by an amount of 0.02% or so is unavoidable. This is the reason why the N content should be selected to be not greater than 0.02%.

Nb,Ta: Nb and Ta are elements which provide resistance to corrosion and stabilize C. To obtain an appreciable effect, the sum of the Nb and Ta contents should be not smaller than 15×(C+N). Too large a content of Nb and/or Ta, however, is not preferred because it undesirably promotes the formation of intermetallic compounds of Ni—Si—Nb system. From this point of view, the Nb and/or Ta content should be minimized, although up to 0.45% is permissible. This in turn limits the (C+N) content to be not greater than 0.03%.

The welding material in accordance with the invention is an austenite steel having an extremely high Si content and containing Nb and/or Ta. These elements tend to increase undesirably the solidification cracking sensitivity of the weld metal in the welding. In order to reduce the solidification cracking sensitivity, the Ni-balance value mentioned above is controlled in the welding material of the invention to range between −4 and −2 so as to form 5 to 15% of δ ferrite in the weld metal. When the Ni-balance value is greater than −2, the amount of δ ferrite generated is so small that there is a reduction in cracking sensitivity. On the other hand, when the Ni-balance value is below −4, the amount of δ ferrite produced becomes so large that the toughness of the weld metal is undesirably impaired.

The features and advantages of the invention will be more fully realized from the following description of examples.

EXAMPLES

Figure 2:
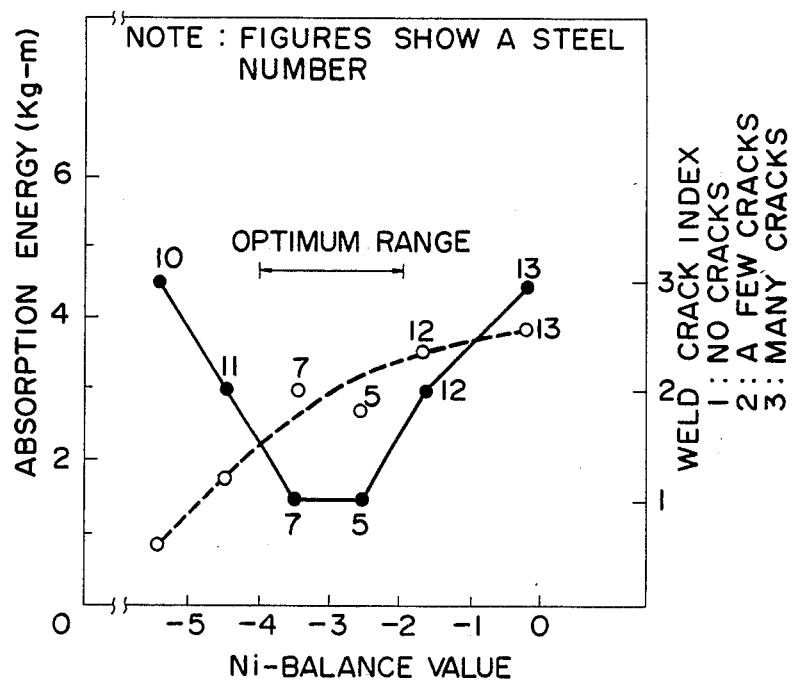
FIG. 2 shows how the impact absorption energy of the weld metal and the cracking property are affected by the value of Ni-balance.
Figure 3:
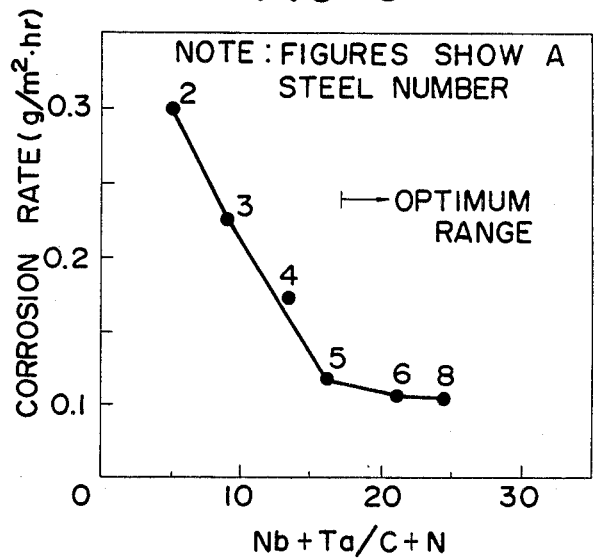
FIG. 3 shows the result of an experiment conducted to examine the corrosion resistance of the weld metal in an actual nitric-acid plant.

The following Table shows the chemical compositions of welding materials in accordance with the invention, together with those of comparison examples. With these welding materials, test welding was conducted in accordance with MIG and TIG welding methods, the results of which are shown in the accompanying drawings FIGS. 1 to 3. It will be clear to those skilled in the art that, since the test welding was conducted in accordance with MIG and TIG welding methods, the chemical compositions of weld metals as shown in FIGS. 1 to 3 are materially identical to those of the welding materials.

| | | | Chemical Composition of Welding Material (%) | | | | | | | |
|---|---|---|---|---|---|---|---|---|---|---|
| No. | C | Si | Mn | Cr | Ni | N | Nb + Ta | Nb + Ta/ C + N | Ni—balance value | Remarks |
| 1 | 0.004 | 5.94 | 0.97 | 16.09 | 14.97 | 0.012 | 0.06 | 3.8 | −3.4 | Comparison examples |
| 2 | 0.011 | 6.07 | 0.90 | 16.94 | 15.87 | 0.017 | 0.15 | 5.2 | −3.4 | Comparison examples |
| 3 | 0.009 | 6.11 | 0.95 | 17.12 | 16.54 | 0.015 | 0.22 | 9.0 | −3.1 | Comparison examples |
| 4 | 0.006 | 6.04 | 0.94 | 16.13 | 15.68 | 0.010 | 0.22 | 13.8 | −3.0 | Comparison examples |
| 5 | 0.007 | 5.91 | 0.95 | 16.20 | 15.88 | 0.013 | 0.33 | 16.5 | −2.6 | materials of |

-continued

| | Chemical Composition of Welding Material (%) | | | | | | | | |
|---|---|---|---|---|---|---|---|---|---|
| No. | C | Si | Mn | Cr | Ni | N | Nb + Ta | Nb + Ta/ C + N | Ni—balance value | Remarks |
| 6 | 0.006 | 5.92 | 0.54 | 16.01 | 15.46 | 0.013 | 0.41 | 21.6 | −3.1 | invention materials of invention |
| 7 | 0.008 | 6.05 | 0.83 | 17.13 | 16.24 | 0.014 | 0.34 | 15.5 | −3.5 | materials of invention |
| 8 | 0.005 | 6.14 | 0.92 | 16.24 | 16.31 | 0.015 | 0.50 | 25.0 | −2.7 | comparison examples |
| 9 | 0.003 | 5.74 | 1.00 | 16.17 | 16.27 | 0.011 | 0.61 | 43.6 | −2.2 | comparison examples |
| 10 | 0.007 | 6.02 | 0.93 | 16.95 | 14.01 | 0.013 | 0.35 | 17.5 | −5.5 | comparison examples |
| 11 | 0.006 | 5.97 | 0.87 | 16.92 | 15.02 | 0.011 | 0.37 | 21.8 | −4.5 | comparison examples |
| 12 | 0.008 | 6.20 | 0.98 | 17.15 | 18.47 | 0.010 | 0.37 | 20.6 | −1.6 | comparison examples |
| 13 | 0.006 | 6.15 | 0.89 | 16.89 | 19.54 | 0.012 | 0.36 | 20.0 | −0.2 | comparison examples |

FIG. 1 shows how the impact absorption energy of the weld metal varies in relation to the (Nb+Ta) content. From this Figure, it will be seen that an impact absorption energy of not smaller than 2 Kg-m/sec, which is considered as being a sufficient value of toughness for the weld metal, can be obtained by selecting the (Nb+Ta) content to be not greater than 0.45%.

FIG. 2 shows the effect of Ni-balance value on the impact absorption energy and the cracking sensitivity of the weld metal. It will be seen that the impact absorption energy is increased as the Ni-balance value approaches the + (plus) side. A value of impact absorption energy of 2 Kg-m/cm$^2$ or higher, which is practically acceptable, is obtained when the Ni-balance value is not smaller than −4. On the other hand, the cracking sensitivity of welding is sufficiently small when the Ni-balance value ranges between −4 and −2. An Ni-balance value of less than −4 involves a tendency to cause low-temperature cracking, while an Ni-balance value exceeding =2 increases the tendency to cause high-temperature solidification cracking. For these reasons, the composition is preferably adjusted to make the Ni-balance value fall within the range of between −4 and −2.

FIG. 3 shows the result of 1208 hr test in the corrosion test conducted in an actual plant which handles nitric acid (98% boiled HNO$_3$, NOx gas atmosphere) as for the weld metals (as weld). The corrosion resistance of not greater than 0.1 g/m$^2$ hr is generally acceptable. It will be seen that this value of corrosion resistance can be attained when the ratio (Nb+Ta)/(C+N) is 15 or greater.

Although the invention has been described in its preferred forms, it will be clear to those skilled in the art that various modifications and variations may be made within the scope of the invention which is limited by the appended claims.

What is claimed is:

1. A welding material composition for welding a high-Si austenite stainless steel, consisting essentially of not greater than about 0.15% of C, Si in the range of about 5 to about 7%, not greater than about 2% Mn, Cr in the range of greater than 16% to less than or equal to 20%, Ni in the range of about 10 to 22%, not greater than about 0.02% N, not greater than about 0.45% of at least one of Nb and Ta, and the balance substantially Fe and inevitable impurities, wherein the sum of the C and N contents is not greater than about 0.03% and the sum of the Nb and Ta contents is not less than 15×(C+N)%, and wherein the Ni balance value given by the following formula ranges between about −4 to −2:

Ni balance value=%-Ni+30×(C%+N%)+0.5(%Mn)−1.1(%Cr+1.5×%Si)+8.2.

2. A method for welding a high-Si austenite stainless steel, consisting essentially of the steps of:
providing a high-Si austenite stainless steel; and
welding said high-Si austenite stainless steel with a welding material having a composition of not greater than about 0.015% of C, Si in the range of about 5 to about 7%, not greater than about 2% Mn, Cr in the range of greater than 16% to less than or equal to 20%, Ni in the range of about 10 to 22%, not greater than about 0.02% N, not greater than about 0.45% of at least one of Nb and Ta, and the balance substantially Fe and inevitable impurities, wherein the sum of the C and N contents is not greater than about 0.03% and the sum of the Nb and Ta contents is not less than 15×(C+N)%, and wherein the Ni balance value given by the following formula ranges between about − ∝ to −2:

Ni balance value=%-Ni+30×(C%+N%)+0.5(%Mn)−1.1(%Cr+1.5×%Si)+8.2.

* * * * *